(12) United States Patent
George et al.

(10) Patent No.: US 9,261,026 B2
(45) Date of Patent: Feb. 16, 2016

(54) SYSTEM AND METHOD FOR CONDITIONING NOISY SIGNALS

(71) Applicant: PRATT & WHITNEY CANADA CORP., Longueuil (CA)

(72) Inventors: Kim George, Montreal (CA); Poi Loon Tang, Montreal (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1 day.

(21) Appl. No.: 14/069,770

(22) Filed: Nov. 1, 2013

(65) Prior Publication Data

US 2015/0006058 A1 Jan. 1, 2015

Related U.S. Application Data

(60) Provisional application No. 61/840,149, filed on Jun. 27, 2013.

(51) Int. Cl.
*F02C 9/00* (2006.01)
*F01D 21/00* (2006.01)
*H02N 2/18* (2006.01)
*G01L 23/08* (2006.01)

(52) U.S. Cl.
CPC . *F02C 9/00* (2013.01); *F01D 21/00* (2013.01); *G01L 23/08* (2013.01); *H02N 2/181* (2013.01)

(58) Field of Classification Search
CPC ............ G06F 15/00; G06F 17/18; F02C 9/00
USPC ................ 702/179, 185; 701/100; 73/112.01, 73/53.01, 64.56
See application file for complete search history.

(56) References Cited

U.S. PATENT DOCUMENTS

| 4,352,094 | A | 9/1982 | Reneric | |
| 7,581,434 | B1* | 9/2009 | Discenzo | G01N 33/2888 73/53.01 |
| 8,996,334 | B2* | 3/2015 | Trejo Sanchez ... | G05B 23/0275 702/179 |
| 2005/0066711 | A1* | 3/2005 | Discenzo | G01N 33/2888 73/64.56 |

(Continued)

FOREIGN PATENT DOCUMENTS

JP 05-248897 9/1993

OTHER PUBLICATIONS

Rajagopalan "Generalized Causal Moving Average (GCMA) Smoothing Filter for Real-Time Applications", Proceedings of SPIE, vol. 5205, Advanced Signal Processing Algorithms, Architectures, and Implementations XIII, p. 426-433, Dec. 31, 2003.

*Primary Examiner* — Thomas G Black
*Assistant Examiner* — Wae Louie
(74) *Attorney, Agent, or Firm* — Norton Rose Fulbright Canada LLP

(57) ABSTRACT

There is provided a system and method for conditioning a noisy signal. A sensing signal is received during each one of a plurality of successive control cycles, the sensing signal comprising a measurement component indicative of a measurement of at least one engine parameter and a noise component. A curve-fitting technique is applied to the received sensing signal for filtering thereof to attenuate the noise component, the filtering comprising, during a first one of the plurality of the control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

20 Claims, 10 Drawing Sheets

(56) References Cited

U.S. PATENT DOCUMENTS

| | | | |
|---|---|---|---|
| 2010/0076714 A1* | 3/2010 | Discenzo | H02N 2/181 702/104 |
| 2011/0000287 A1* | 1/2011 | Bacic | F16K 37/0083 73/112.01 |
| 2011/0167025 A1* | 7/2011 | Danai | G05B 17/02 706/12 |
| 2011/0202800 A1* | 8/2011 | Mackey | G05B 23/0283 714/37 |
| 2011/0264392 A1 | 10/2011 | Ramond et al. | |
| 2013/0046507 A1* | 2/2013 | Vega Paez | F01D 21/00 702/179 |
| 2014/0327489 A1* | 11/2014 | Tang | G05B 21/02 333/17.1 |
| 2015/0006058 A1* | 1/2015 | George | G01L 23/08 701/100 |

* cited by examiner

US 9,261,026 B2

SYSTEM AND METHOD FOR CONDITIONING NOISY SIGNALS

TECHNICAL FIELD

The application relates generally to the control of gas turbine engines, and more particularly to conditioning of noisy signals.

BACKGROUND OF THE ART

In modern gas turbines, detection of events, such as a shaft breakage event, can be performed by monitoring engine parameters using suitable sensing devices. The measurements are then sent to a control system, which applies detection logic to the data to determine if a predefined event signature is present. In particular, a derivative of the sensed signals is typically computed in order to determine the rate of change of the monitored engine parameters.

However, the sensed signals often contain noise components, such as steady state and transient noise components. When the derivative of a given sensed signal is taken, the resulting rate of change signal greatly amplifies any small noise component of the underlying sensed signal. The event signatures are in turn rendered undetectable within the noise floor. In order to remove the noise, traditional real-time filters may be applied to the sensed signals. Still, such filtering also induces significant signal delays, which prove unacceptable for high speed event detection, such as detection of shaft breakage events.

There is therefore a need for an improved system and method for conditioning noisy signals.

SUMMARY

In one aspect, there is provided a system for conditioning a noisy signal, the system comprising a receiving unit adapted to receive a sensing signal during each one of a plurality of successive control cycles, the sensing signal comprising a measurement component indicative of a measurement of at least one parameter of an engine and a noise component, and a processing unit adapted to apply a curve-fitting technique to the received sensing signal for filtering thereof to attenuate the noise component, the filtering comprising, during a first one of the plurality of control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

In another aspect, there is provided a method for conditioning a noisy signal, the method comprising receiving a sensing signal during each one of a plurality of successive control cycles, the sensing signal comprising a measurement component indicative of a measurement of at least one engine parameter and a noise component, and applying a curve-fitting technique to the received sensing signal for filtering thereof to attenuate the noise component, the filtering comprising, during a first one of the plurality of the control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

In a further aspect, there is provided a system for conditioning a noisy signal, the system comprising means for receiving a sensing signal during each one of a plurality of successive control cycles, the sensing signal comprising a measurement component indicative of a measurement of at least one engine parameter and a noise component, and means for applying a curve-fitting technique to the received sensing signal for filtering thereof to attenuate the noise component, the filtering comprising, during a first one of the plurality of the control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

DESCRIPTION OF THE DRAWINGS

Reference is now made to the accompanying figures in which.

DETAILED DESCRIPTION

Figure 1:
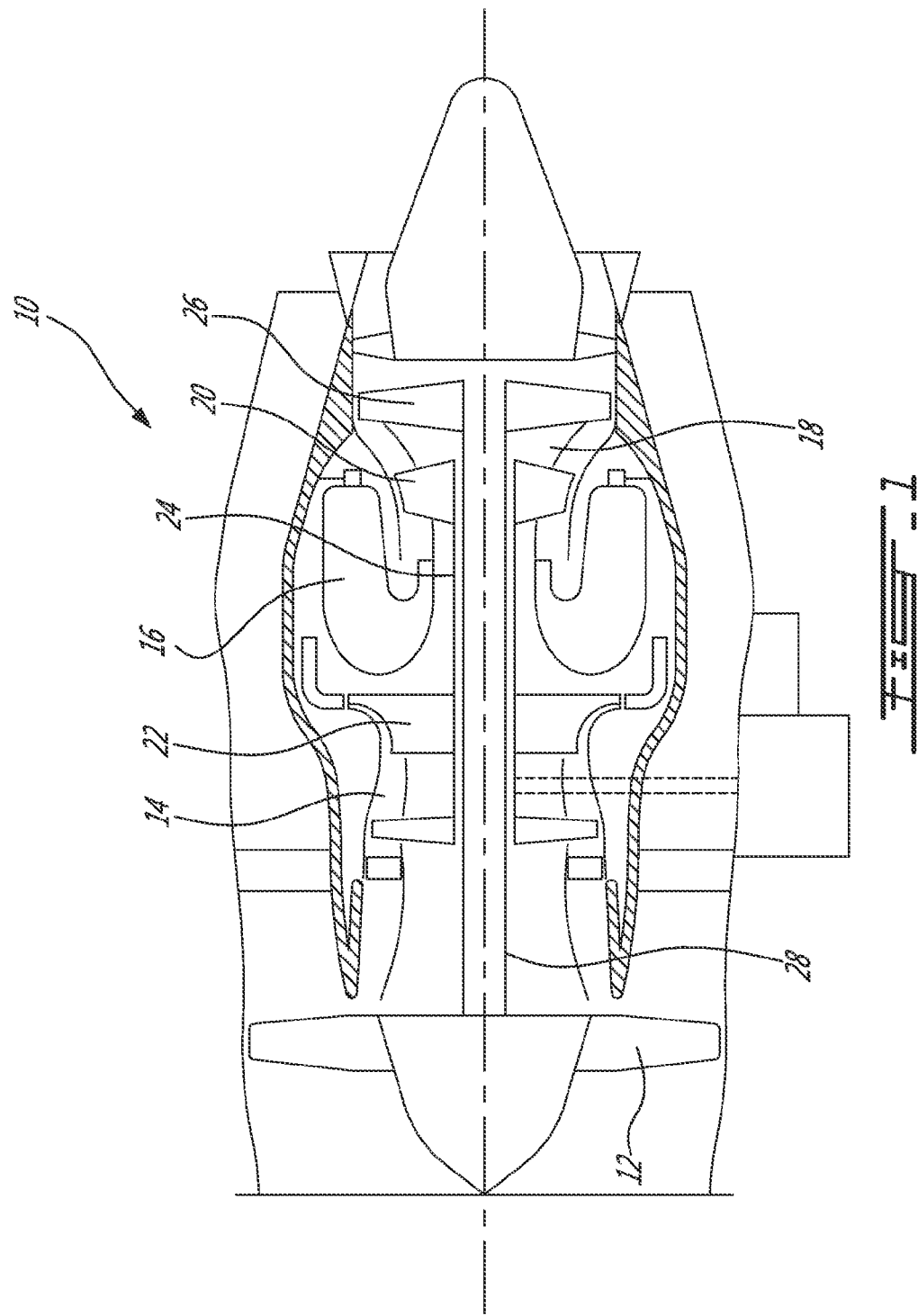
FIG. 1 is a schematic cross-sectional view of a gas turbine engine.

FIG. 1 illustrates a gas turbine engine 10 of a type typically provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Figure 2:
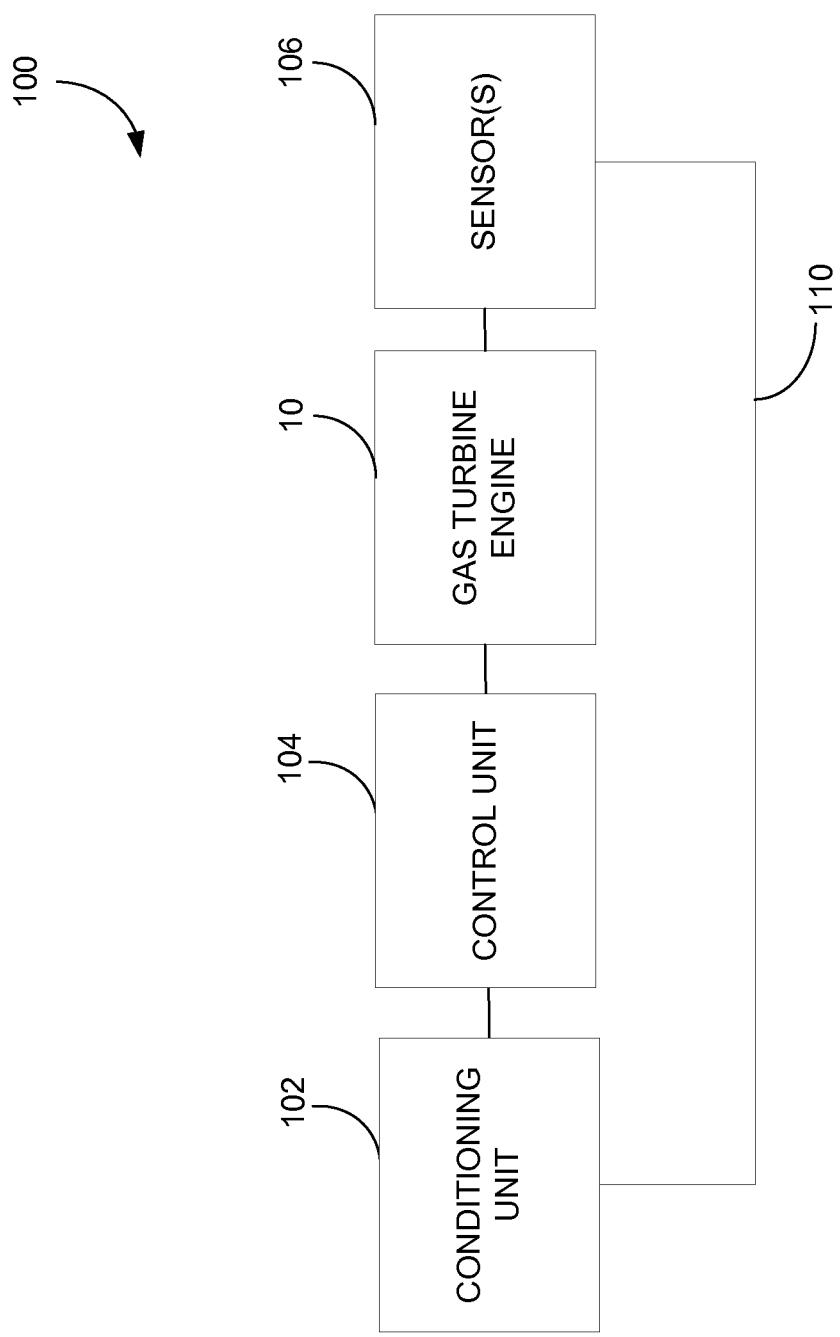
FIG. 2 is a schematic diagram of a system for conditioning noisy signals, in accordance with an illustrative embodiment.

Referring to FIG. 2, a system 100 for conditioning noisy signals will now be described. The system 100 illustratively comprises a conditioning unit 102, a control unit 104 for controlling the gas turbine engine 10 and one or more monitoring devices, such as sensors 106, for monitoring one or more parameters of the engine 10. The sensors 106 may be any sensor suitable for monitoring the engine parameters. Examples of such sensors 106 include, but are not limited to, speed sensors, pressure sensors, temperature sensors, humidity sensors, and accelerometers. The conditioning unit 102 may comprise a digital computer or processor unit for conditioning noisy signals, as will be discussed further below. The control unit 104 may comprise a digital computer or Engine Control Unit (ECU, not shown) in communication with the hardware of the engine 10 for controlling an operation of the latter. In particular, the conditioning unit 102 and the control unit 104 may be part of a Full Authority Digital Engine Control (FADEC) (not shown) used to manage operation of the gas turbine engine 10 by controlling the engine 10 through acceleration, deceleration, and steady state operation. The FADEC may modulate fuel flow to the engine 10, schedule and control surge protection systems, protect the gas turbine engine 10 from overspeed and overtemperature, perform complete engine start control, as well as control opening and closing of bleed-off valves and other engine variable geometries.

The sensors 106 illustratively monitor responses of one or more engine components, identify the health of these components, and deliver an output as required. In particular, the sensors 106 sense one or more engine parameters and generate sensed signal(s) accordingly. The rate of change in the one or more engine parameters may then be monitored by computing a derivative of the sensed signal(s). In one embodiment, the sensors 106 monitor engine variables including, but not limited to, N1 speed (speed of the first spool 28 of the engine 10), N2 speed (speed of the second spool 24 of the engine 10), rate of change in N1 speed, and rate of change in N2 speed. It should be understood that other engine variables may be monitored. The signals output by the sensors 106 are then fed to the conditioning unit 102 either in a wired manner using a direct link 110, such as a wire, or wirelessly over a suitable network (not shown). In this manner, the readings from the sensors 106 can be received at the conditioning unit 102 in real-time during a flight and acted upon to enhance the performance, stability, and reliability of the turbine engine 10.

The sensor signals are however typically corrupted by noise in transmission lines, electro-magnetic radiation (EMI), cross talk, shaft torsional modes, and the like. The conditioning unit 102 therefore illustratively implements a noise filtering scheme to condition such noisy signals. In particular, the filtering implemented by the conditioning unit 102 enables to extract valid signals, e.g. signals indicative of the measurements taken by the sensors 106, from the noisy signals. It may be desirable for such filtering to be performed without introduction of undue delays and amplitude distortion. In this manner, any issue or defect with the engine 10 can be detected speedily, thereby preventing potentially harmful consequences. As will be discussed further below, the detection speed illustratively depends on the event detection window set by the conditioning unit 102. The event detection window may be set so as to ensure only a given event whose event signature is being detected by the conditioning unit 102 produces the event signature. In one embodiment, the event detection window is set to twenty-four (24) ms such that the conditioning unit 102 achieves a detection speed lower than twenty-four (24) ms. It should be understood that other event detection windows may apply.

Figure 3:
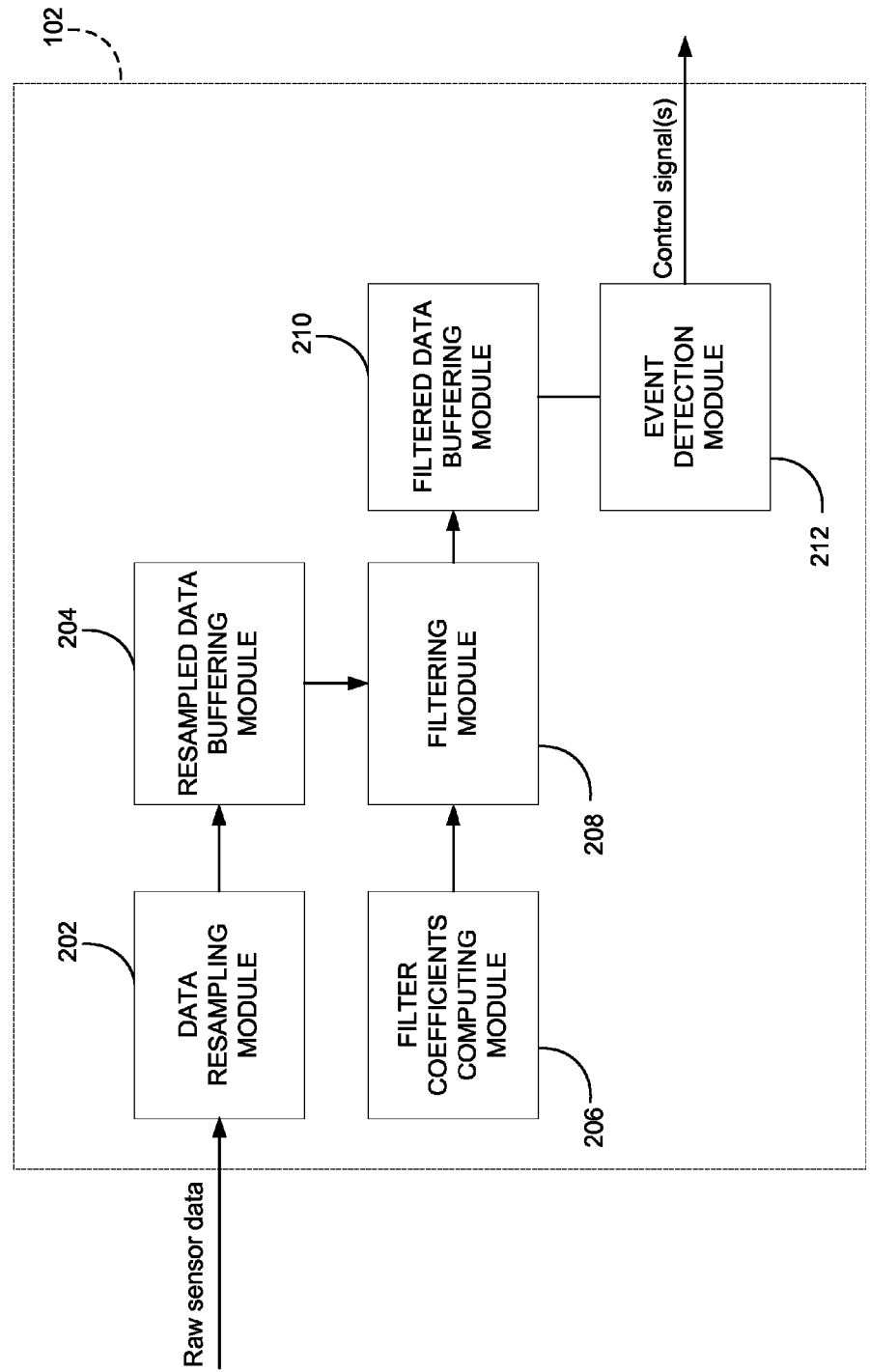
FIG. 3 is a schematic diagram of the conditioning unit of FIG. 2.

FIG. 3 is an exemplary embodiment of the conditioning unit 102. In this embodiment, the conditioning unit 102 comprises a data resampling module 202, a resampled data buffering module 204, a filter coefficients computing module 206, a filtering module 208, a filtered data buffering module 210, and an event detection module 212.

The sensors (reference 106 in FIG. 2) illustratively measure the engine variables once every control cycle and the raw sensor data is sent to the conditioning unit 102 where they may be received at a receiving unit (not shown). It should however be understood that the sensors 106 may take measurements at a rate greater or lower than once every control cycle. For instance, the raw sensor data collected by the sensors 106 may be oversampled, i.e. may contain more than one data sample per control cycle, depending on the speed at which the engine (reference 10 in FIG. 2) operates. In order to ensure that the data sent to the filtering module 208 contains a desired number L of equispaced data points, the data resampling module 202 may be used to resample the raw data. The number L of resampled points may be chosen and the resampling procedure performed to ensure that there is a consistent number of points per frame despite the fact that a sensor signal is sampled at a variable rate. In particular, the raw sensor data is sent to the data resampling module 202, which uses any suitable resampling technique, such as linear interpolation, to resample the raw sensor data to achieve the desired number of data points. The resampled sensor data output by the data resampling module 202 then comprises L equally spaced data points and is sent to the resampled data buffering module 204.

The resampled data buffering module 204 in turn forms a buffer where the resampled sensor data, which is ready to be filtered, is stored. The buffering module discussed herein, e.g. the resampled data buffering module 204 and the filtered data buffering module 210, may be implemented in a fixed location of a physical memory (not shown) and/or by using a virtual data buffer pointing at a location in the physical memory. It is desirable for the buffer formed by the resampled data buffering module 204 to store the data set of L data points received during the present control cycle (CT0), the data set of L data points received during the previous control cycle (CT-1), and the data set of L data points received during the oldest control cycle (CT-2). The unfiltered data vector provided to the filtering module 208 may then comprise 3L data points. This enables the conditioning unit 102 to cover the CT0, CT-1, and CT-2 time ranges, as will be discussed further below. It should be understood that the conditioning unit 102 may cover more or less time ranges, depending on the desired amount of correction to be applied to the noisy signals. Indeed, in the embodiment discussed herein, the conditioning unit 102 processes the sensor data twice through the filtering module 208, i.e. double filtering of the data set is achieved, thereby requiring coverage of the CT0, CT-1, and CT-2 time ranges. In other embodiments, triple, quadruple, or any other level of filtering may apply and other time ranges may thus be covered.

The filter coefficients computing module 206 computes filter coefficients for use by the filtering module 208. Choosing the appropriate filter coefficients can influence the particular behaviour of the filter implemented by the filtering module 208. In one embodiment, the filtering module 208 implements a Savitzky-Golay smoothing technique that uses a least-squares curve-fitting approach. Using this technique, filtering of the data with the filter coefficients may create a curve having a given slope and individual data points may then be filtered to be close to the created curve. A time series is thus smoothed by replacing each value of the series with a new value obtained from a moving window using a polynomial fit to 2M+1 neighboring data points (including the data point to be smoothed). In this case, the filter has a length of 2M+1 where M is an integer equal to or greater than the order P of the polynomial. It should be understood that any other appropriate filtering technique, such as using a finite impulse response (FIR) or a suitable low pass filter, may apply. Still, regardless of the filtering technique used, it is desirable for the filter to minimize delays while introducing little complexity and computational load to the control unit (reference 104 in FIG. 2).

As known to those skilled in the art, Savitzky-Golay filter coefficients depend on the type of chosen polynomial, e.g. on the order P thereof, and on the number of neighbours around a point, e.g. on the size 2M+1 of the moving window. Thus, knowing the values of P and M, the filter coefficients computing module 206 can precompute the filter coefficients offline regardless of the sensor data to be filtered. In other words, the filter coefficients computing module 206 need not compute the filter coefficients at each control cycle but may compute them once, thereby requiring less processing power. In this manner, using the filter coefficients computed offline, it becomes possible for the conditioning unit 102 to perform curve-fitting to condition noisy signals in real time, as will be discussed further below. For this purpose, a least-squares fitting method can be applied to compute the coefficients, which can then be stored in memory (not shown) in any suitable format, such as in a look-up table. It should be understood that, depending on the type of filter to be implemented by the filtering module 208, the filter coefficients computing module 206 may use other techniques to derive the filter coefficients.

The filter coefficients computed by the filter coefficients computing module 206 may be terminal (or historical asymmetrical), steady state (or symmetrical), or startup (or future asymmetrical) coefficients. The terminal coefficients can be used to filter most recent samples, which do not have future data available. The steady state coefficients can be used to filter data, which has an equal amount of future and historical data available. The startup coefficients can be used to filter data, which has only future data points available. Once computed, the filter coefficients are then output by the coefficients computing module 206 and sent to the filtering module 208, which also receives the buffered resampled data from the resampled data buffering module 204. The filtering module 208 then processes the received data and applies the filter coefficients to the buffered resampled data. The filtering module 208 then outputs filtered data in which noise has been filtered from actual sensor readings. The filtered data output by the filtering module 208 is then stored in the filtered data buffering module 210 to achieve real-time data smoothing, as will be discussed further below.

The event detection module 212 then processes the data buffered by the filtered data buffering module 210 to determine whether a predefined event signature, which is indicative of a problem with the engine 10, is present. For this purpose, the event detection module 212 is used to detect events that occur over a defined time period (or event detection window). For instance, the event detection module 212 may assess from the buffered filtered data whether the rate of change in N1 speed is below a predetermined threshold while the rate of change of N2 speed remains within a predefined tolerance. If this is the case, the event detection module 212 can conclude to shearing or breakage of the low pressure turbine shaft (reference 30 in FIG. 1). The event detection module 212 having detected such shaft breakage, the event detection module 212 can then output to the engine 10 one or more control signals indicative of the detected defect and/or of measure(s) to be implemented to correct the defect. It then becomes possible to prevent potentially damaging consequences of the engine defect. For instance, once the shaft breakage has been detected, the control signal(s) output by the event detection module 212 can cause corrective measures to be taken to prevent failure and fragmentation of the low pressure rotor(s) (reference 26 in FIG. 1) of the turbine section (reference 18 in FIG. 1). As discussed above, it should be understood that several engine variables may be monitored by the sensors 106 and that the conditioning unit 102 may accordingly be used to detect a variety of issues (e.g. flameout in the combustion chamber) with the engine 10 other than shaft breakage or shearing. The conditioning unit 102 may indeed be used for high speed detection of any event in a given signal or signals.

Figure 4:
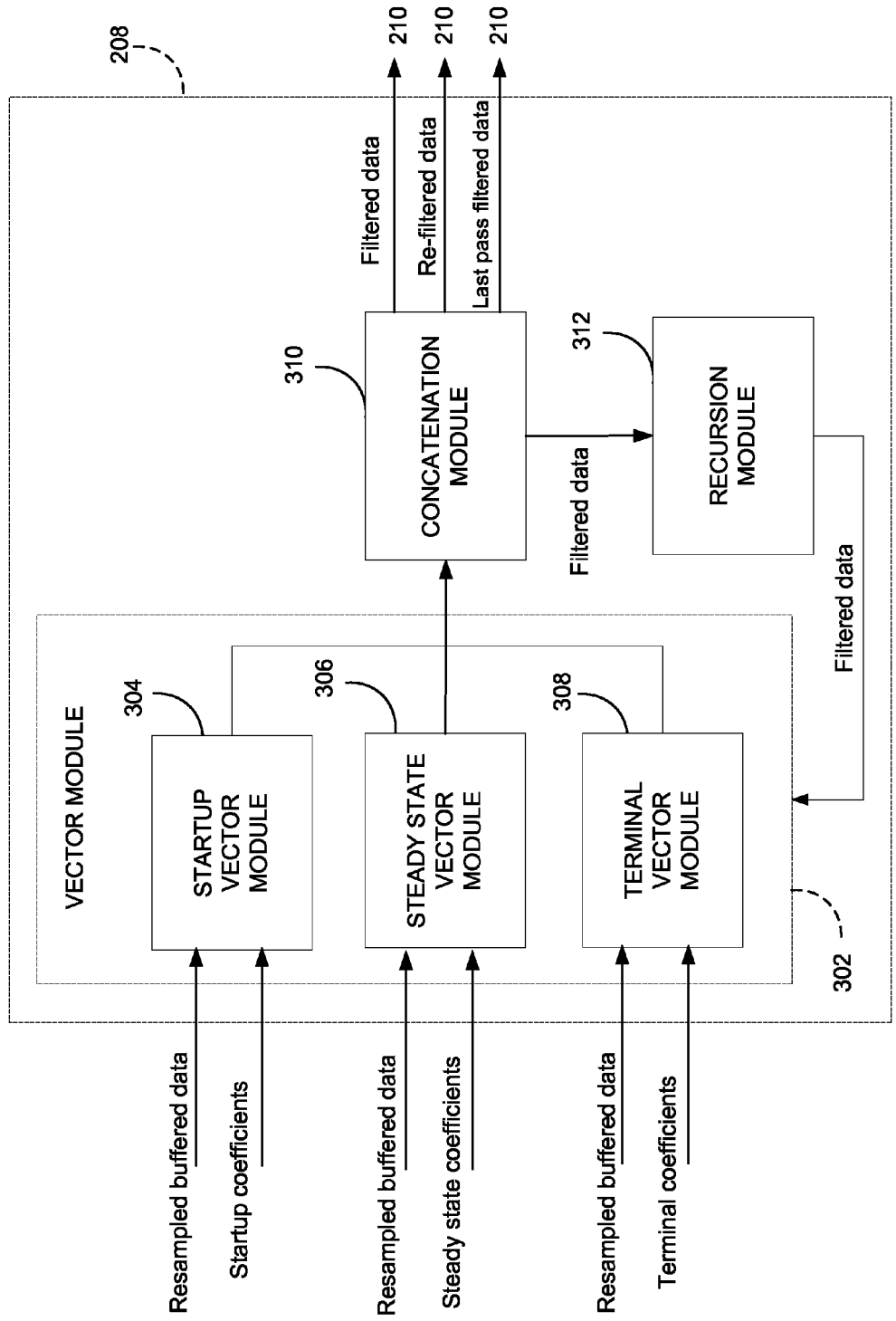
FIG. 4 is a schematic diagram of the filtering module of FIG. 3.

FIG. 4 is an exemplary embodiment of the filtering module 208. The filtering module 208 illustratively uses curve fitting to avoid filter lag. In this manner, the sensor signals can be treated with little to no delay and problems with the engine (reference 10 in FIG. 2) can be detected at high speed. In particular and as will be discussed further below, by correcting already filtered sensor data and buffering data filtered over past control cycles, the filtering module 208 can be applied to real-time settings and achieve high speed event detection.

Using the filter coefficients received from the filter coefficients computing module 206, the filtering module 208 illustratively implements the Savitzky-Golay smoothing technique (although it should be understood that any other suitable filtering technique can apply). For this purpose, the filtering module 208 may comprise a vector module 302 comprising a startup vector module 304, a steady state vector module 306, and a terminal vector module 308. Although the filtering module 208 is described herein as comprising the startup vector module 304, it should be understood that the latter is optional, being primarily used for implementing filter recursion. Thus, depending on the application, the filtering module 208 may or may not comprise such a startup vector module 304. The filtering module 208 may further comprise a concatenation module 310 and a recursion module 312.

Each one of the startup vector module 304, the steady state vector module 306, and the terminal vector module 308 may respectively receive from the filter coefficients computing module 206 startup, steady state, and terminal coefficients. The startup vector module 304, the steady state vector module 306, and the terminal vector module 308 may further receive at each control cycle the resampled buffered data from the resampled data buffering module 204. Each one of the startup vector module 304, the steady state vector module 306, and the terminal vector module 308 then performs a vector operation in which the module 304, 306, 308 multiplies the resampled buffered data by the received coefficients to output a filtered data vector of length L. In one embodiment, the steady state vector and the terminal vector are then sent to the concatenation module 310, which concatenates the two vectors of length L data points to form a final filtered vector of length 2L data points. As the startup vector module 304 may only be used when it is desired to perform recursion, the startup vector is illustratively only sent to the concatenation module 310 whenever filter recursion is used. Using vector operations and a Savitzky-Golay filter implemented by the filtering module 208, it becomes possible to use all the data points received in a previous control cycle to reconstruct a signal profile, which occurred in between control cycles. This is especially true since the Savitzky-Golay filter is effective at filtering individual raw data points. As such, the confidence that a real event has been detected by the event detection module (reference 212 in FIG. 3) is increased.

In one embodiment, during the present control cycle CT0, the startup vector module 304, when used to perform filter recursion, computes the startup vector by applying the startup coefficients to data, which only has future data points available, i.e. to the data sets received during the previous and oldest control cycles, e.g. CT-1 and CT-2 data sets. The terminal vector module 308 computes the terminal vector by applying the terminal coefficients to data, which does not have future data points available, i.e. to the data sets received during the present and the previous control cycles, e.g. CT0 and CT-1 data sets. The steady state vector module 306 computes the steady state vector by applying the steady state coefficients to data, which has an equal amount of future and historical data points available. The steady state vector is then computed using all three data sets, namely the data received during the present (CT0) and the two previous control cycles (CT-1, CT-2). For this purpose, the steady state vector module 306 shifts the data sets by the length of the filter's window, e.g. by 2M+1 data points, until all data points have been filtered. For instance, if M=25, the filter window, and accordingly the number of filter coefficients, is equal to 2*25+1=51. The first element of the steady state vector is then formed by considering twenty-five (25) data points of the CT-2 data set, twenty-five (25) data points of the CT-1 data set, and one (1) data point of the CT0 data set. The second element of the steady state vector is formed by considering 25−1=24 data points of the CT-2 data set, twenty-five (25) data points of the CT-1 data set, and 1+1=2 data points of the CT0 data set. This process is repeated until obtention of the last element of the steady state vector, which is formed by considering one (1) data point of the CT-2 data set, twenty-five (25) data points of the CT-1 data set, and twenty-five (25) data points of the CT0 data set.

The filtered data vector output by the concatenation module 310 is sent to the filtered data buffering module 210 for storage, as will be discussed further below, as well as to the recursion module 312, which determines therefrom recursion to be implemented, as required. The recursion module 312 may indeed be used to cause the filtered data vector to be further filtered so as to increase smoothing of noise present in the data set. As discussed above, the amount of recursion, e.g. filtering, implemented by the filtering module 208 may vary depending on the applications. In one embodiment, the recursion level is set to a constant, e.g. two (2) times, such that sensor data is filtered twice. Any other predetermined constant number of recursions may be used to achieve the desired level of noise attenuation. The recursion module 312 may, upon receiving the filtered data, perform a statistical check, such as standard deviation, on the filtered data and cause the recursion, e.g. the re-filtering, operation to continue until the statistical measure is within predetermined bounds.

At the next control cycle, the raw data filtered in the previous cycle is then filtered once more by the vector module 302 applying the suitable filter coefficients thereto. In particular, the vector module 302 refilters the raw data using the steady state (or symmetrical) coefficients received from the filter coefficients computing module 206. This refiltering operation can be performed on the past data now that future data is available, thereby correcting any errors created by applying the terminal coefficients to the sensor data during the first pass of the filtering algorithm. Indeed, using the curve-fitting technique, filtering of the data with the terminal coefficients may create a curve having an incorrect slope. Once future data is available, it becomes possible to ensure that the slope is optimally fit by applying correction (using the steady state coefficients) to the raw sensor data to refit a curve thereto. Using knowledge of past as well as future data, correction of past filtered data can then be achieved in real-time.

As discussed above, the re-filtering step may be recursively applied as many times as desired to achieve a suitable level of noise attenuation of the filtered data. The re-filtered data is then output by the vector module 302 and concatenated by the concatenation module 310 into a single vector. The re-filtered data is then sent to the filtered data buffering module 210 for storage. When the recursion module 312 determines, e.g. from a statistical measure, that the filtered data received from the concatenation module 310 has already been sufficiently filtered, the recursion module 312 accordingly outputs a control signal to the concatenation module 310. This causes the concatenation module 310 to output the data as last pass filtered data directly to the filtered data buffering module 210. Indeed, the last pass filtered data need not be corrected as the data fit is considered optimal.

In one embodiment, the filtering module 208 does not comprise the recursion module 312 and only the (one-time) filtered data is in this case sent to the filtered data buffering module 210 during the present control cycle. At the next control cycle, the last pass raw sensor data is re-filtered using the steady state coefficients to correct errors from the first pass of the filtering algorithm, which applied the terminal coefficients.

Figure 5:
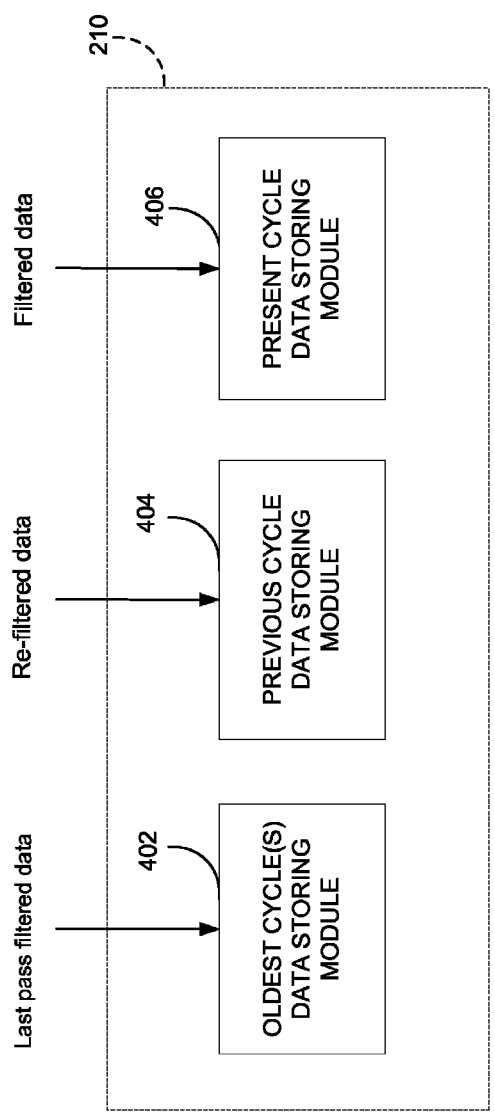
FIG. 5 is a schematic diagram of the filtered data buffering module of FIG. 3.
Figure 6:
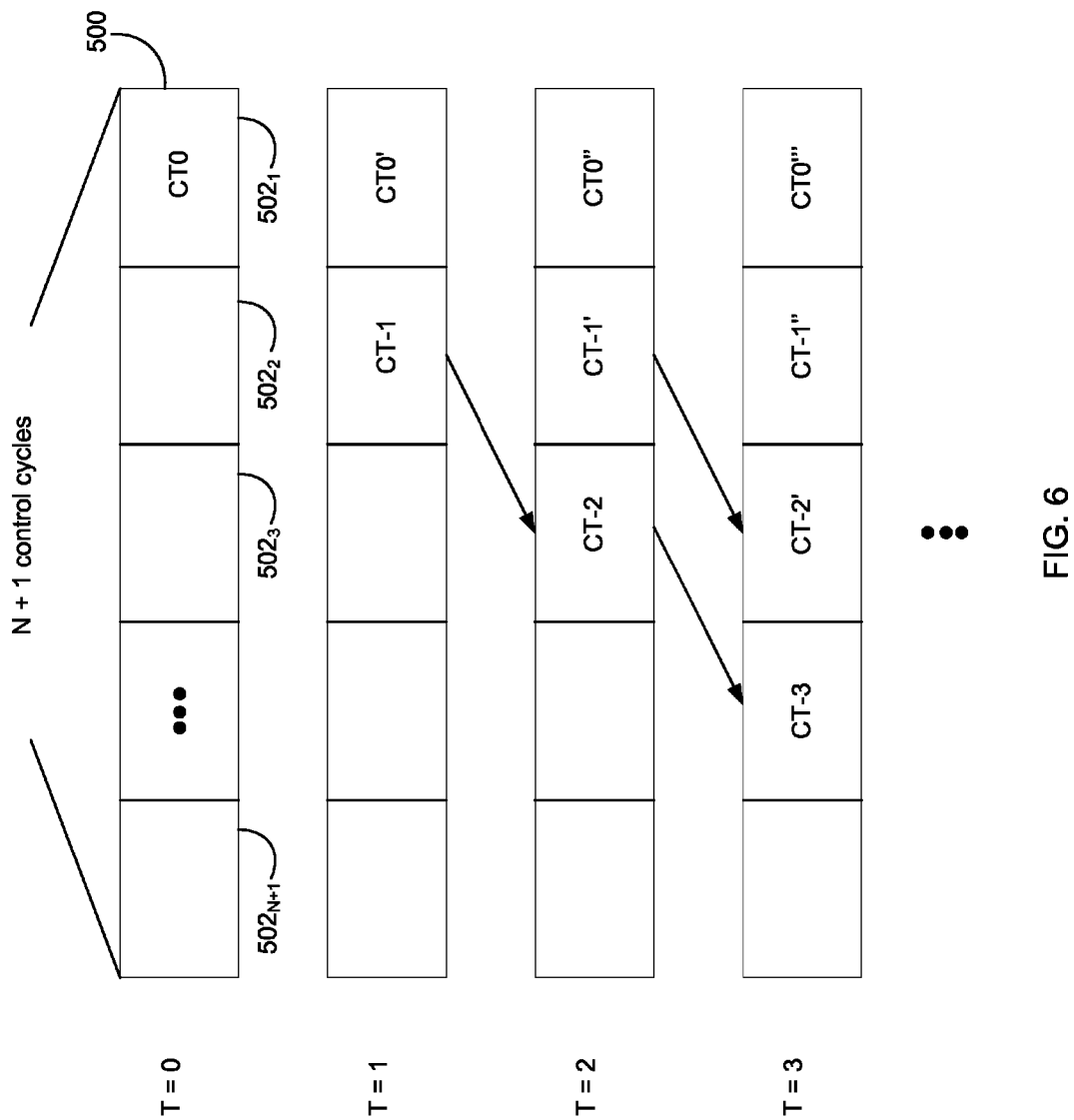
FIG. 6 is a schematic diagram of a data buffer formed by the filtered data buffering module of FIG. 5.

FIG. 5 is an exemplary embodiment of the filtered data buffering module 210. The filtered data buffering module 210 illustratively comprises an oldest cycle(s) data storing module 402, a previous cycle data storing module 404, and a present cycle data storing module 406. FIG. 6 is an exemplary embodiment of a data buffer 500 formed by the filtered data buffering module 210. The data buffer 500 illustratively comprises N+1 elements as in $502_1$, $502_2$, ..., $502_{N+1}$, with N+1 the size of the event detection window of the event detection module (reference 212 in FIG. 3). Indeed, although the data is imperfectly fit in frame CT0, using the refiltering procedure implemented by the filtering module 208, as discussed above with reference to FIG. 4, allows to obtain N cycles of optimally fit data (frames CT-1, ..., CT-N). Including the most recent and suboptimally fit data (i.e. CT0 data) in the event detection window, which then has a size of N+1 cycles, then allows to achieve least possible lag. This in turn provides confidence that the event being detected did happen within the N+1 cycles, which contain both the suboptimally fit dataframe and the N optimally fit data frames. It should be understood that, although buffer element $502_1$ is shown as being the last element of the buffer 500, the buffer element $502_1$ may be the first element of the buffer 500. Element $502_1$ of the data buffer 500 stores the most recent data, e.g. the data received during the present control cycle (CT0 data) and filtered using terminal filter coefficients by the filtering module (reference 208 in FIG. 4). Already known and past filtered data is stored in the remaining N elements $502_2$, ..., $502_{N+1}$. In particular, at each control cycle, the present cycle data storing module 406 illustratively receives filtered data from the concatenation module (reference 310 in FIG. 4) and stores this data in element $502_1$ of the data buffer 500. The previous cycle data storing module 404 illustratively receives re-filtered data and stores this data in element $502_2$ of the data buffer 500. The oldest cycle(s) data storing module 402 illustratively receives last pass filtered data and stores this data in corresponding elements $502_3$, ..., $502_{N+1}$ of the data buffer 500.

As can be seen in FIG. 6, at the first control cycle (e.g. at time T=0), the data buffer 500 only stores in element $502_1$ the present control cycle data set (CT0 data set) that has been filtered by the vector module (reference 302 in FIG. 4). At the next control cycle (e.g. at time T=1), the filtered data (CT0 data set) previously stored in element $502_1$ has been re-filtered using the steady state coefficients applied by the steady state vector module (reference 306 of FIG. 4). The re-filtered data (CT-1 data set) is then stored in element $502_2$ of the data buffer while the present control cycle data (CT0' data set) that has been filtered by the terminal vector module 308 is stored in element $502_1$ in place of the filtered data (CT0 data set) of the previous cycle. At the following control cycle (e.g. at time T=2), the present control cycle data (CT0" data set) filtered by the terminal vector module 308 is now stored in element $502_1$.

The filtered data (CT0' data set) previously stored in element $502_1$ has been re-filtered using the steady state vector module 306. The re-filtered data (CT-1' data set) is then stored in element $502_2$. The re-filtered data (CT-1 data set) previously stored in element $502_2$ is then stored in element $502_3$ as last pass filtered data (CT-2 data set). This process is repeated until the last control cycle where the data buffer 500 stores in element $502_1$ suboptimally fit data, in element $502_2$ optimally fit data which has been corrected since the last control cycle, and in remaining elements $502_2, \ldots, 502_{N+1}$ optimally fit data saved from the last pass of the filter algorithm implemented by the filtering module (reference 208 in FIG. 3).

Figure 7:
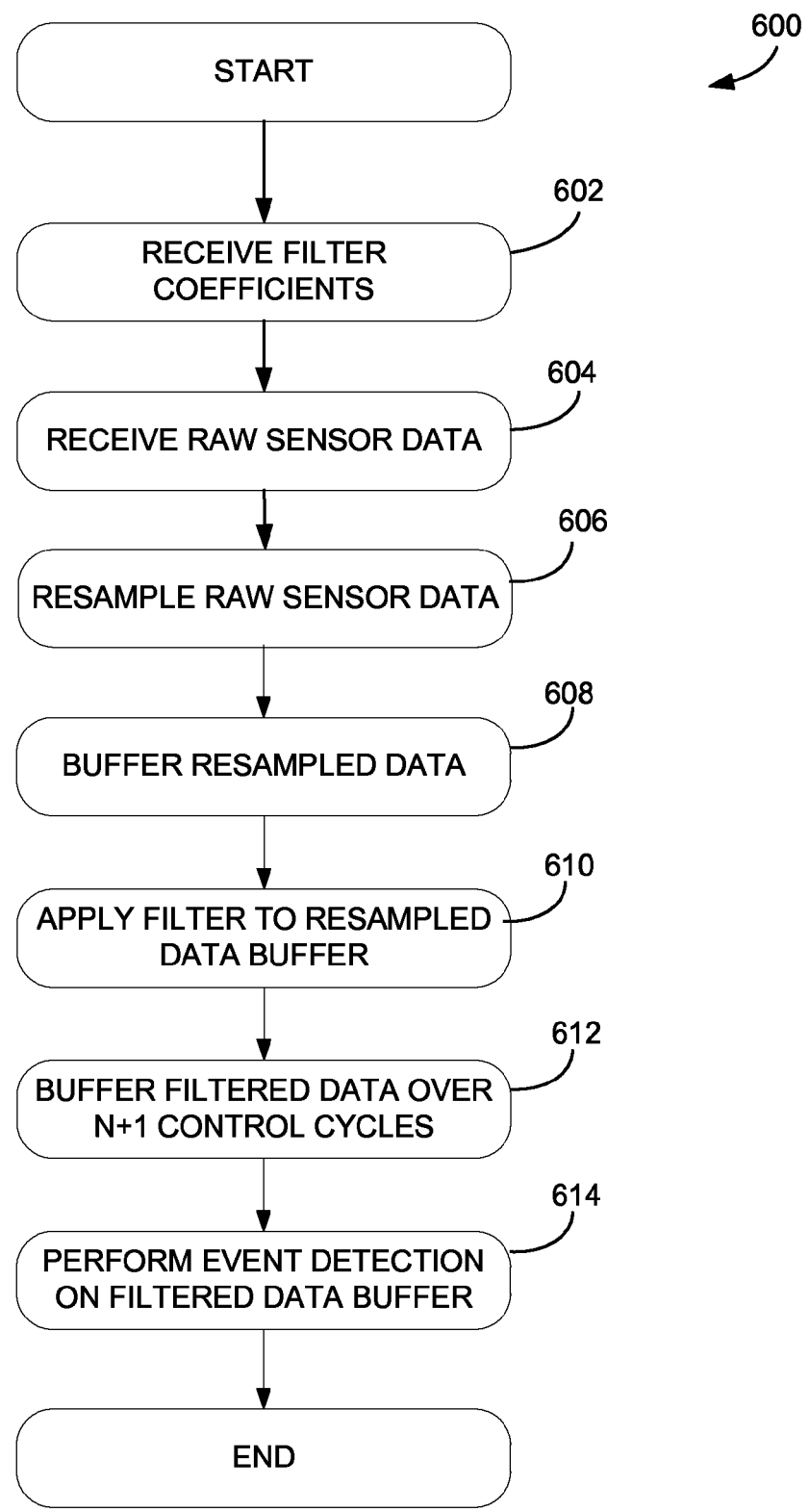
FIG. 7 is a flowchart of a method for conditioning noisy signals, in accordance with an illustrative embodiment.

Referring now to FIG. 7, a method 600 for conditioning noisy signals will now be described. The method 600 illustratively comprises receiving filter coefficients, i.e. terminal, steady state, and startup coefficients, at step 602. As discussed above, the filter coefficients may be computed offline. The method 600 further illustratively comprises receiving raw sensor data at step 604, resampling the received raw sensor data at step 606, buffering the resampled data at step 608. The method 600 further comprises applying a filter, such as a Savitzky-Golay filter, to the resampled data buffer at step 610, storing the filtered data over N+1 control cycles at step 612, and performing event detection on the filtered data buffer at step 614.

Figure 8:
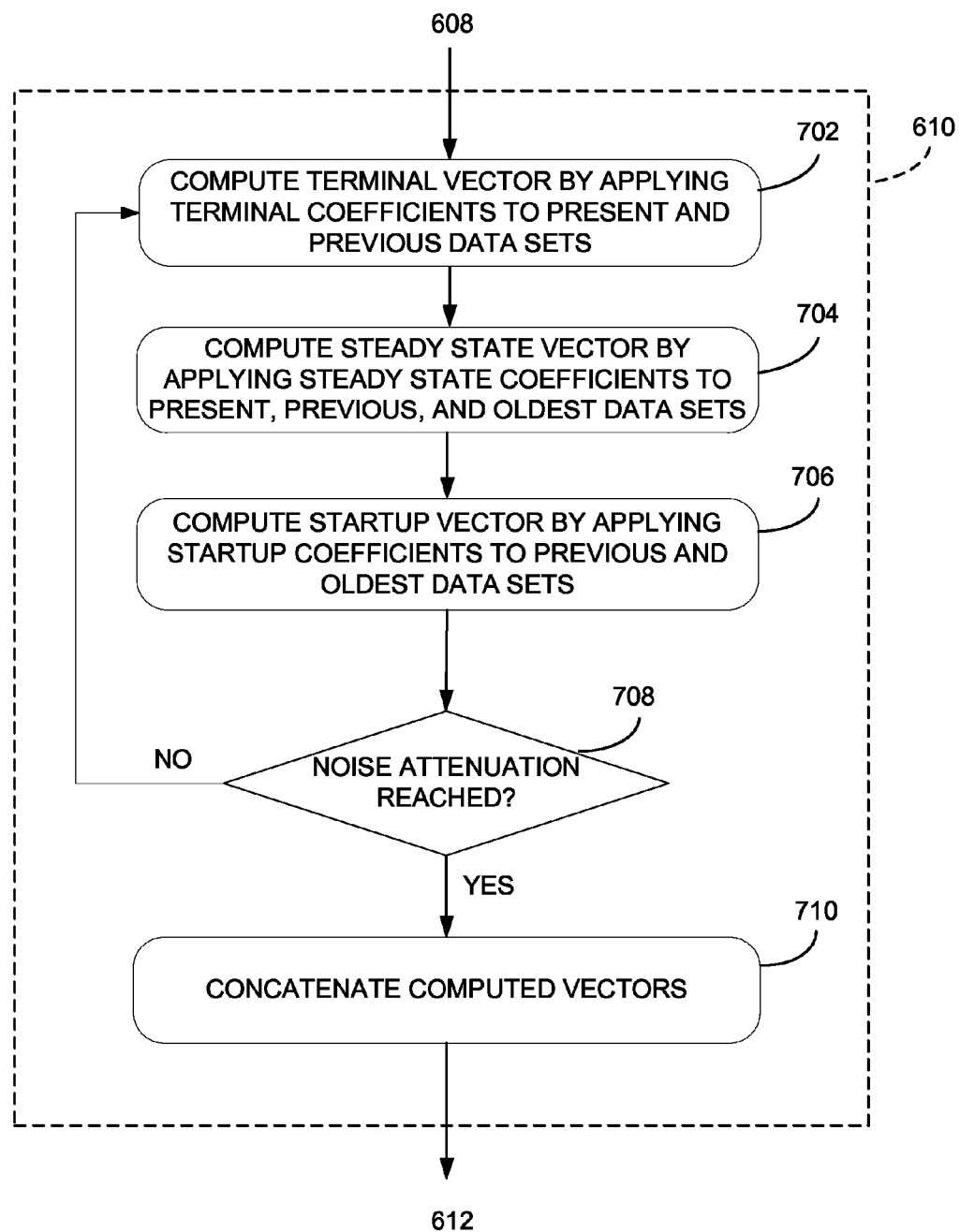
FIG. 8 is a flowchart of the step of FIG. 7 of applying a filter to a resampled data buffer.

Referring to FIG. 8, the step 610 of applying a filter to the resampled data buffer illustratively comprises at step 702 computing the terminal vector by applying the terminal filter coefficients received at step 602 to the present (CT0) and previous (CT-1) data sets from the resampled data buffer, as discussed above. The next step 704 may then be to compute the steady state vector by applying the steady state coefficients received at step 602 to the present, previous, and oldest (CT-2) data sets from the resampled data buffer. The next step 706 may then be to compute the startup vector by applying the startup coefficients received at step 602 to the previous and oldest data sets. As discussed above, it should be understood that step 706 is optional and may only be performed when implementing filter recursion. The next step 708 may then be to determine whether the desired noise attenuation has been reached. If this is not the case, the method 600 may flow back to the step 702. Otherwise, the next step 710 may be to concatenate the computed vectors, i.e. the terminal, steady state, and startup vectors, as discussed above.

Figure 9:
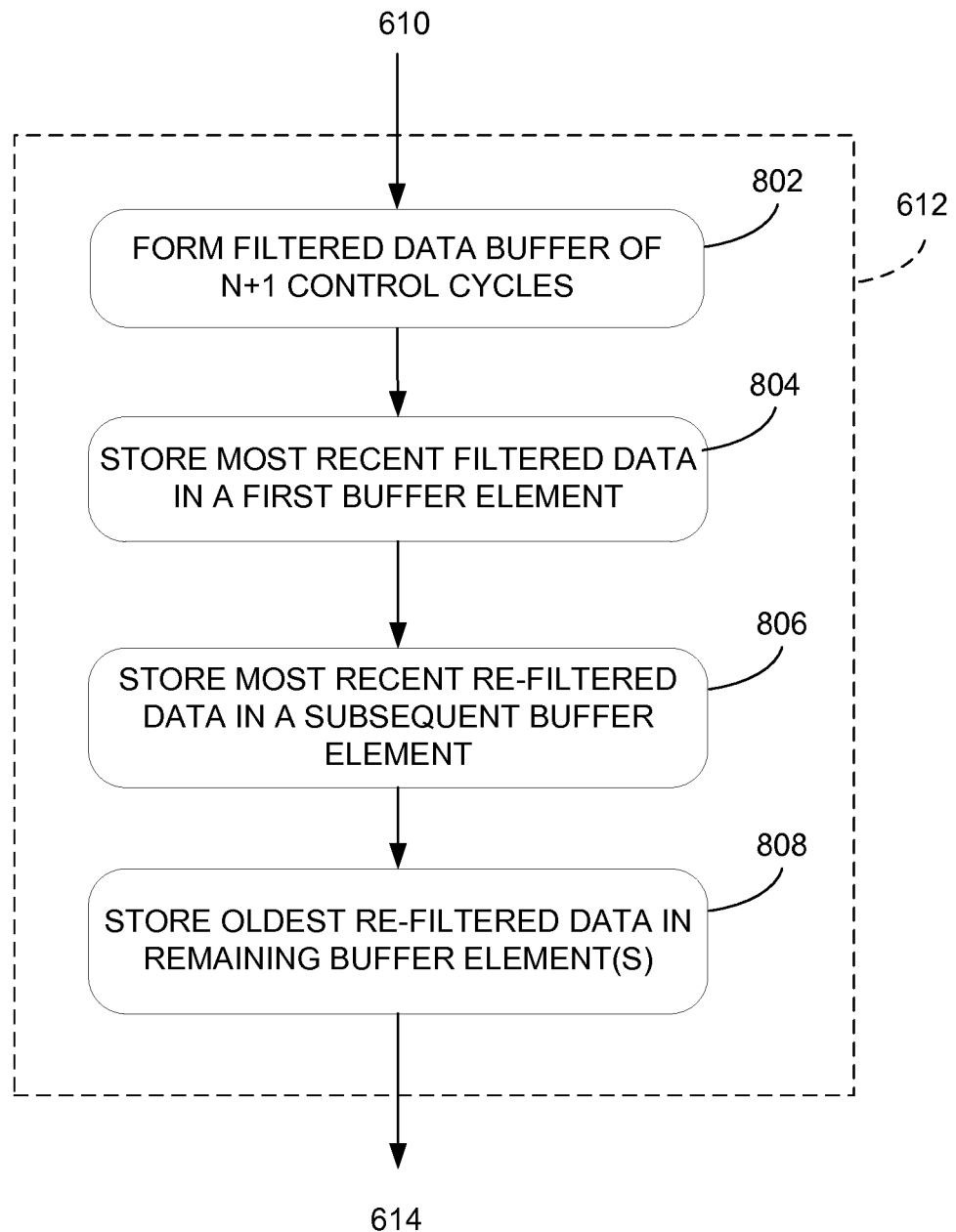
FIG. 9 is a flowchart of the step of FIG. 7 of buffering the filtered data buffer over N+1 control cycles.

Referring to FIG. 9, the step 612 of forming a filtered data buffer illustratively comprises forming at step 802 a filtered data buffer of N+1 control cycles, storing at step 804 the most recent filtered data in a first buffer element, storing at step 806 the most recent re-filtered data in a subsequent buffer element, and storing at step 808 the oldest re-filtered data in the remaining buffer element(s) in the manner discussed above with reference to FIG. 5 and FIG. 6.

Figure 10:
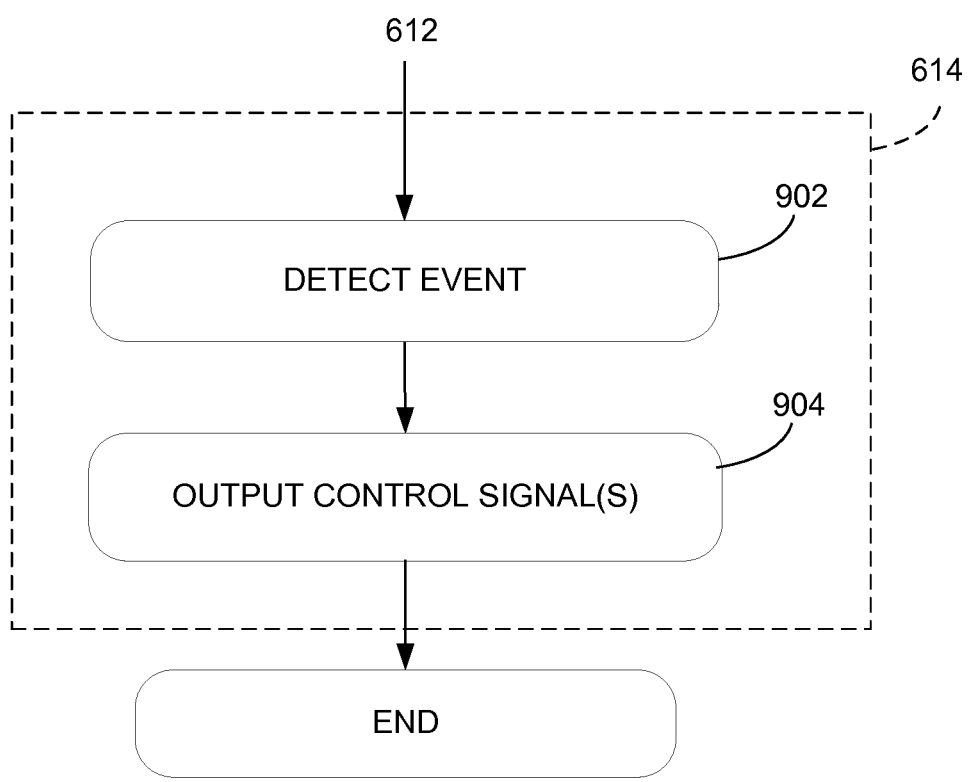
FIG. 10 is a flowchart of the step of FIG. 7 of performing event detection on the filtered data buffer.

Referring to FIG. 10 and as discussed above when describing the event detection module (reference 212 in FIG. 3), the step 614 of performing event detection on the filtered data buffer comprises detecting an event at step 902 and outputting at step 904 one or more control signal(s) in accordance with the detected event.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for conditioning a noisy signal, the system comprising:
    a receiving unit adapted to receive a sensing signal during each one of a plurality of successive control cycles, the sensing signal comprising a measurement component indicative of a measurement of at least one parameter of an engine and a noise component; and
    a processing unit adapted to apply a non-real time curve-fitting technique to the received sensing signal for real-time filtering of the received sensing signal to attenuate the noise component, the filtering comprising, during a first one of the plurality of control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

2. The system of claim 1, wherein the processing unit is adapted to form a data buffer comprising a first number of buffer elements, the first number equal to a second number of the plurality of control cycles, and to store, during the first control cycle being a present one of the plurality of control cycles, the filtered data generated during the first control cycle in a first one of the buffer elements and the corrected data generated during a third control cycle previous to the first control cycle in a second one of the buffer elements, the second buffer element subsequent to the first buffer element.

3. The system of claim 2, wherein the processing unit is adapted to, starting from the second control cycle, (a) for a selected buffer element, starting from the second buffer element until a last one of the buffer elements is reached, move the corrected data stored in the selected buffer element to a given buffer element subsequent to the selected buffer element; and (b) repeat step (a) until a last one of the plurality of control cycles is reached.

4. The system of claim 3, wherein the processing unit is adapted to compute a first set of filter coefficients and a second set of filter coefficients and to apply the curve-fitting technique to the sensing signal by applying the first set of filter coefficients to data points of the sensing signal received during the first control cycle and to data points of the sensing signal received during the third control cycle, thereby generating a first data vector, and applying the second set of filter coefficients to the data points of the sensing signal received during the first control cycle, to the data points of the sensing signal received during the third control cycle, and to data points of the sensing signal received during a fourth control cycle anterior to the third control cycle, thereby generating a second data vector.

5. The system of claim 4, wherein the processing unit is adapted to determine whether filter recursion is to be used and, if filter recursion is to be used, to compute a third set of filter coefficients and to apply the third set of filter coefficients to the data points of the sensing signal received during the third control cycle and to the data points of the sensing signal received during the fourth control cycle anterior to the third control cycle, thereby generating a third data vector.

6. The system of claim 5, wherein the processing unit is adapted to concatenate the first, second, and third data vectors into a single filtered data vector.

7. The system of claim 6, wherein the first, second, and third sets of filter coefficients computed by the processing unit are terminal, steady state, and startup Savitzky-Golay filter coefficients, respectively.

8. The system of claim 3, wherein the processing unit is adapted to detect at least one event signature within buffered data stored in the buffer elements, generate at least one control signal for causing at least one action to be taken in response to detecting the at least one event signature, and output the at least one control signal.

9. The system of claim 1, wherein the processing unit is adapted to
set the corrected data as current data,
define an iterative procedure comprising
filtering the current data, thereby generating filtered current data, and
setting the filtered current data as the current data; and
perform the iterative procedure for a predetermined number of iterations.

10. The system of claim 9, wherein the predetermined number of iterations for which the processing unit performs the iterative procedure is determined such that a desired attenuation of the noise component is reached at a last one of the iterations.

11. A computer-implemented method for conditioning a noisy signal, the method comprising:
receiving a sensing signal during each one of a plurality of successive control cycles, the sensing signal comprising a measurement component indicative of a measurement of at least one engine parameter and a noise component; and
applying a non-real time curve-fitting technique to the received sensing signal for real time filtering of the received sensing signal to attenuate the noise component, the filtering comprising, during a first one of the plurality of the control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

12. The method of claim 11, further comprising forming a data buffer comprising a first number of buffer elements, the first number equal to a second number of the plurality of control cycles, and storing, during the first control cycle being a present one of the plurality of control cycles, the filtered data generated during the first control cycle in a first one of the buffer elements and the corrected data generated during a third control cycle previous to the first control cycle in a second one of the buffer elements, the second buffer element subsequent to the first buffer element.

13. The method of claim 12, further comprising, starting from the third control cycle, (a) for a selected buffer element, starting from the second buffer element until a last one of the buffer elements is reached, moving the corrected data stored in the selected buffer element to a given buffer element subsequent to the selected buffer element; and (b) repeating step (a) until a last one of the control cycles is reached.

14. The method of claim 13, further comprising computing a first set of filter coefficients and a second set of filter coefficients and applying a curve-fitting technique to the received sensing signal by applying the first set of filter coefficients to data points of the sensing signal received during the first control cycle and to data points of the sensing signal received during the third control cycle, thereby generating a first data vector, and applying the second set of filter coefficients to the data points of the sensing signal received during the first control cycle, to the data points of the sensing signal received during the third control cycle, and to data points of the sensing signal received during a fourth control cycle anterior to the third control cycle, thereby generating a second data vector.

15. The method of claim 14, further comprising determining whether filter recursion is to be used and, if filter recursion is to be used, computing a third set of filter coefficients and applying the third set of filter coefficients to the data points of the sensing signal received during the third control cycle and to the data points of the sensing signal received during the fourth control cycle anterior to the third control cycle, thereby generating a third data vector.

16. method of claim 15, further comprising concatenating the first, second, and third data vectors into a single filtered data vector.

17. The method of claim 16, wherein computing the first, second, and third set of filter coefficients comprises computing terminal, steady state, and startup Savitzky-Golay filter coefficients.

18. The method of claim 17, further comprising detecting at least one event signature within buffered data stored in the buffer elements, generating at least one control signal for causing at least one action to be taken in response to detecting the at least one event signature, and outputting the at least one control signal.

19. The method of claim 11, further comprising
setting the corrected data as current data;
defining an iterative procedure comprising
filtering the current data, thereby generating filtered current data, and
setting the filtered current data as the current data; and
performing the iterative procedure for a predetermined number of iterations for achieving a desired attenuation of the noise component.

20. A system for conditioning a noisy signal, the system comprising:
means for receiving a sensing signal during each one of a plurality of successive control cycles, the sensing signal comprising a measurement component indicative of a measurement of at least one engine parameter and a noise component; and
means for applying a non-real time curve-fitting technique to the received sensing signal for real-time filtering of the received sensing signal to attenuate the noise component, the filtering comprising, during a first one of the plurality of the control cycles, asymmetrically filtering the sensing signal received during the first control cycle, thereby generating filtered data, and, during a second control cycle subsequent to the first control cycle, symmetrically filtering the sensing signal received during the first control cycle, thereby generating corrected data.

\* \* \* \* \*